United States Patent
Yokoshima et al.

(10) Patent No.: US 11,195,668 B2
(45) Date of Patent: Dec. 7, 2021

(54) ELECTROCHEMICAL DEVICE

(71) Applicant: TAIYO YUDEN CO., LTD., Tokyo (JP)

(72) Inventors: Katsunori Yokoshima, Takasaki (JP); Koji Kano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 204 days.

(21) Appl. No.: 16/489,308

(22) PCT Filed: Feb. 21, 2018

(86) PCT No.: PCT/JP2018/006121
§ 371 (c)(1),
(2) Date: Aug. 27, 2019

(87) PCT Pub. No.: WO2018/155468
PCT Pub. Date: Aug. 30, 2018

(65) Prior Publication Data
US 2020/0066459 A1 Feb. 27, 2020

(30) Foreign Application Priority Data

Feb. 27, 2017 (JP) .............................. JP2017-035432
Feb. 27, 2017 (JP) .............................. JP2017-035433
(Continued)

(51) Int. Cl.
*H01G 11/06* (2013.01)
*H01G 11/70* (2013.01)
(Continued)

(52) U.S. Cl.
CPC ............. *H01G 11/06* (2013.01); *H01G 11/12* (2013.01); *H01G 11/50* (2013.01); *H01G 11/70* (2013.01); *H01M 10/0585* (2013.01)

(58) Field of Classification Search
CPC ......... H01G 11/24; H01G 11/70; H01G 11/06
See application file for complete search history.

(56) References Cited

U.S. PATENT DOCUMENTS

2009/0154064 A1 6/2009 Tasaki et al.
2011/0236763 A1 9/2011 Noda et al.
2018/0013148 A1* 1/2018 Matsuura ................ C22C 1/026

FOREIGN PATENT DOCUMENTS

| JP | 2007067105 A | 3/2007 |
| JP | 2011204378 A | 10/2011 |
| WO | 2006112068 A1 | 10/2006 |

OTHER PUBLICATIONS

International Search Report (ISR) dated May 22, 2018, issued for International application No. PCT/JP2018/006121. (1 page).
(Continued)

*Primary Examiner* — Eric W Thomas
(74) *Attorney, Agent, or Firm* — Law Office of Katsuhiro Arai

(57) ABSTRACT

An electrochemical device includes a first electrode unit; a second electrode unit; a third electrode unit; a first lithium ion supply source, which is disposed between the first electrode unit and the third electrode unit and includes a first current collector that is a porous metal foil having a first main surface on the side of the first electrode unit; a second lithium ion supply source, which is disposed between the second electrode unit and the third electrode unit and includes a second current collector that is a porous metal foil having a third main surface on the side of the second electrode unit; and an electrolyte. Lithium ions are pre-doped from first metal lithium attached to the first main surface, and second metal lithium attached to the third main surface, into the negative electrode of each electrode unit.

12 Claims, 12 Drawing Sheets

(30) Foreign Application Priority Data

Feb. 27, 2017 (JP) .............................. JP2017-035434
Apr. 7, 2017 (JP) .............................. JP2017-077000

(51) Int. Cl.
*H01M 10/0585* (2010.01)
*H01G 11/12* (2013.01)
*H01G 11/50* (2013.01)

(56) References Cited

OTHER PUBLICATIONS

Notification of Transmittal of Translation of the International Preliminary Report on Patentability (PCT/IB/338) dated Sep. 6, 2019, with International Preliminary Report on Patentability (PCT/IB/373) and Written Opinion of the International Searching Authority (PCT/ISA/237), for corresponding international application PCT/JP2018/006121, (9 pages).
A Notice of Reasons for Refusal issued by the Japanese Patent Office, dated Feb. 9, 2021, for Japanese counterpart application No. 2017-035432. (2 pages).
A Notice of Reasons for Refusal issued by the Japanese Patent Office, dated Jan. 19, 2021, for Japanese counterpart application No. 2017-035434. (2 pages).

* cited by examiner

| Negative electrode position | SOC |
|---|---|
| First electrode unit (uppermost layer) | 58.3% |
| Third electrode unit (center) | 55.2% |
| Second electrode unit (lowermost layer) | 58.1% |

| Opening ratio / Negative electrode position | Comparative Example a | Example a | Example b | Example c | Example d | Comparative Example b |
|---|---|---|---|---|---|---|
| | 15% | 20% | 25% | 30% | 35% | 40% |
| First electrode unit (uppermost layer) | 63.9% | 59.6% | 57.6% | 54.6% | 57.2% | 51.4% |
| Third electrode unit (center) | 37.4% | 44.7% | 54.1% | 59.0% | 61.4% | 63.9% |
| Second electrode unit (lowermost layer) | 63.6% | 63.6% | 58.1% | 58.0% | 54.2% | 51.8% |

FIG. 17

| | Example e | Example f | Example g | Comparative Example |
|---|---|---|---|---|
| D1:D2 | 67:33 | 60:40 | 75:25 | 50:50 |
| Resistance change rate (%) | 121 | 126 | 128 | 143 |

FIG. 18

| Distance between current collector and closest negative electrode | 25 μm | 50 μm | 75 μm | 100 μm | 150 μm | 250 μm |
|---|---|---|---|---|---|---|
| Number of separators | 0 | 1 | 2 | 3 | 5 | 10 |
| Cycle life | 44.8k | 53.4k | 57.1k | 59.5k | 62.1k | 62.5k |

FIG.19

ELECTROCHEMICAL DEVICE

CROSS-REFERENCE TO RELATED APPLICATIONS

This application is the U.S. National Phase under 35 U.S.C. § 371 of International Application PCT/JP2018/006121, filed Feb. 21, 2018, which claims priority to Japanese Patent Application Nos. JP2017-035432, filed Feb. 27, 2017, JP2017-035433, filed Feb. 27, 2017, JP2017-035434, filed Feb. 27, 2017, and JP2017-077000, filed Apr. 7, 2017. The International Application was published under PCT Article 21(2) in a language other than English.

TECHNICAL FIELD

The present invention relates to an electrochemical device including a plurality of electrode units.

BACKGROUND ART

Large-capacity capacitors are being used in fields, such as energy regeneration and load leveling, that demand repeated charging and discharging with high power. As a large-capacity capacitor, an electric double layer capacitor has been widely used in the past. In recent years, the use of lithium ion capacitors having a high energy density has been studied.

The lithium ion capacitor needs pre-doping in which lithium ions are doped in a negative electrode in advance. In order to stably use the lithium ion capacitor for a long time, it is important to make the pre-doped state of the negative electrode uniform.

Note that the pre-doping of lithium ions is performed by immersing in an electrolyte, a metal lithium electrically connected to the negative electrode. Lithium ions move in the electrolyte and reach the negative electrode. Therefore, the pre-doped state is affected by the positional relationship between the negative electrode and a lithium ion supply source.

For example, Patent Literature 1 discloses the configuration in which lithium ions are supplied to a negative electrode by disposing lithium ion supply sources between a plurality of electrode units constituting a cell and at the outermost part.

CITATION LIST

Patent Literature

Patent Literature 1: WO 2006/112068

DISCLOSURE OF INVENTION

Technical Problem

However, in the configuration disclosed in Patent Literature 1, there is a problem that the type of parts and the number of parts are large because it is necessary to prepare three types of lithium ion supply sources to be disposed at the uppermost part, the lowermost part, and between the electrode units. Further, the lithium ion supply source to be disposed between the electrode units has a structure in which metal lithium is attached to the front surface and the back surface, which makes the preparation of lithium ion supply sources complicated.

In view of the circumstances as described above, it is an object of the present invention to provide an electrochemical device that is excellent in productivity and capable of making the pre-doped state of a negative electrode uniform.

Solution to Problem

In order to achieve the above-mentioned object, an electrochemical device according to an embodiment of the present invention includes: a first electrode unit; a second electrode unit; a third electrode unit; a first lithium ion supply source; a second lithium ion supply source; and an electrolyte. In the first electrode unit, a positive electrode and a negative electrode are alternately stacked via a separator. In the second electrode unit, a positive electrode and a negative electrode are alternately stacked via a separator. In the third electrode unit, a positive electrode and a negative electrode are alternately stacked via a separator, the third electrode unit being disposed between the first electrode unit and the second electrode unit. The first lithium ion supply source is located between the first electrode unit and the third electrode unit, the first lithium ion supply source including a first current collector that is a porous metal foil having a first main surface on a side of the first electrode unit and a second main surface on a side of the third electrode unit. The second lithium ion supply source is disposed between the second electrode unit and the third electrode unit, the second lithium ion supply source including a second current collector that is a porous metal foil having a third main surface on a side of the second electrode unit and a fourth main surface on a side of the third electrode unit. In the electrolyte, the first electrode unit, the second electrode unit, the third electrode unit, the first lithium ion supply source, and the second lithium ion supply source are immersed. Lithium ions are pre-doped from the first metal lithium and second metal lithium into the negative electrode of each of the first electrode unit, the second electrode unit, and the third electrode unit, the first metal lithium being attached to the first main surface, the second metal lithium being attached to the third main surface.

With this configuration, many lithium ions released from the first lithium ion supply source are supplied to the first electrode unit that the first metal lithium faces, and some of the lithium ions are supplied to the third electrode unit via the through hole of the first current collector that is a porous metal foil. Further, many lithium ions released from the second lithium ion supply source are supplied to the second electrode unit that the second metal lithium faces, and some of the lithium ions are supplied to the third electrode unit via the through hole of the second current collector that is a porous metal foil. The amount of lithium ions to be supplied from the first lithium ion supply source to the third electrode unit is less than the amount of lithium ions to be supplied to the first electrode unit, and the amount of lithium ions to be supplied from the second lithium ion supply source to the third electrode unit is less than the amount of lithium ions to be supplied to the second electrode unit. However, the amount of lithium ions to be pre-doped can be substantially the same between the first electrode unit, the second electrode unit, and the third electrode unit because lithium ions are supplied from both of the first lithium ion supply source and the second lithium ion supply source to the third electrode unit.

Each of the first current collector and the second current collector may be a porous metal foil having an opening ratio of not less than 20% and not more than 35%.

With this configuration, the doping amount of lithium ions in each electrode unit can be adjusted.

Each of the first current collector and the second current collector may be a porous metal foil in which a through hole is formed, the through hole having a hole diameter of not more than 500 µm.

It is favorable that the through holes each have a hole diameter of not more than 500 µm and are evenly distributed over the entire metal foil.

Lithium ions may be pre-doped from first metal lithium, second metal lithium, third metal lithium, and fourth metal lithium into the negative electrode of each of the first electrode unit, the second electrode unit, and the third electrode unit, the first metal lithium having a first thickness and being attached to the first main surface, the second metal lithium having a second thickness smaller than the first thickness and being attached to the second main surface, the third metal lithium having the first thickness and being attached to the third main surface, the fourth metal lithium having the second thickness and being attached to the fourth main surface.

With this configuration, many lithium ions released from the first metal lithium are supplied to the first electrode unit that the first metal lithium faces, and many lithium ions released from the second metal lithium are supplied to the third electrode unit that the second metal lithium faces. Further, many lithium ions released from the third metal lithium are supplied to the second electrode unit that the third metal lithium faces, and many lithium ions released from the fourth metal lithium are supplied to the third electrode unit that the fourth metal lithium faces. Lithium ions are supplied from the first metal lithium and the third metal lithium to the first electrode unit and the second electrode unit, respectively, while lithium ions are supplied from both of the second metal lithium and the fourth metal lithium to the third electrode unit. Here, the amount of lithium ions to be supplied to the third electrode unit is substantially the same as those of the first electrode unit and the second electrode unit because the thickness of the second metal lithium and the thickness of the fourth metal lithium (second thickness) are smaller than the thickness of the first metal lithium and the third metal lithium (first thickness), and thus, it is possible to make the doping amount of lithium ions in each electrode unit uniform.

A ratio of the first thickness and the second thickness may be within a range of 3:1 to 3:2.

It is possible to adjust the ratio of the first thickness and the second thickness in accordance with the thickness of the electrode unit (the number of stacked layers of the positive electrode and the negative electrode), and it is favorable that the ratio of the first thickness and the second thickness is within the range of 3:1 to 3:2.

A first sheet member may be disposed between the first lithium ion supply source and the third electrode unit, the first sheet member separating the first lithium ion supply source and the third electrode unit and causing lithium ions to be transmitted therethrough, and a second sheet member may be disposed between the second lithium ion supply source and the third electrode unit, the second sheet member separating the second lithium ion supply source and the third electrode unit and causing lithium ions to be transmitted therethrough.

With this configuration, it is possible to separate the first lithium ion supply source and the third electrode unit, and the second lithium ion supply source and the third electrode unit, and make lithium ions that have been transmitted through the first current collector and the second current collector evenly distribute in the negative electrode of the third electrode unit.

Each of the first sheet member and the second sheet member may be a separator.

By using the separator as the first sheet member and the second sheet member, it is possible to reduce the types of parts constituting the electrochemical device.

Each of the first sheet member and the second sheet member may include a plurality of stacked separators.

By stacking a plurality of separators, it is possible to further separate the first lithium ion supply source and the third electrode unit, and the second lithium ion supply source and the third electrode unit.

The first sheet member may have a thickness of not less than 25 µm, and the second sheet member may have a thickness of not less than 25 µm.

By setting the thickness of each of the first sheet member and the second sheet member not less than 25 µm, it is possible to improve the diffusion of lithium ions by the first sheet member and the second sheet member, and lithium ions can be evenly distributed in the negative electrode.

The first sheet member may separate the first lithium ion supply source and the negative electrode of the third electrode unit such that a distance between the first current collector and the negative electrode closest to the first lithium ion supply source among the plurality of negative electrodes of the third electrode unit is not less than 50 µm, and the second sheet member may separate the second lithium ion supply source and the negative electrode of the third electrode unit such that a distance between the second current collector and the negative electrode closest to the second lithium ion supply source among the plurality of negative electrodes of the third electrode unit is not less than 50 µm.

By setting the total thickness of the separator and the first sheet member or second sheet member of the third electrode unit not less than 50 µm, it is possible to improve the diffusion of lithium ions in the main surface direction, and the distribution of lithium ions in the negative electrode can be made uniform.

The positive electrode of each of the first electrode unit, the second electrode unit, and the third electrode unit may include a positive electrode current collector and a positive electrode active material layer, the positive electrode current collector being a porous metal foil, the positive electrode active material layer including a positive electrode active material and disposed on both of a front surface and a back surface of the positive electrode current collector, and the negative electrode of each of the first electrode unit, the second electrode unit, and the third electrode unit may include a negative electrode current collector and a negative electrode active material layer, the negative electrode current collector being a porous metal foil, the negative electrode active material layer including a negative electrode active material and being disposed on both of a front surface and a back surface of the negative electrode current collector.

With this configuration, lithium ions released from the first lithium ion supply source and the second lithium ion supply source can move in each electrode unit without being blocked by the positive electrode, the negative electrode, and the separator, and the doping amount of lithium ions in each electrode unit can be made uniform.

Each of the first electrode unit, the second electrode unit, and the third electrode unit may have the same thickness.

With this configuration, it is possible to use, as the first electrode unit, the second electrode unit, and the third electrode unit, electrode units each having the same structure, and the doping amount of lithium ions in each electrode unit can be made uniform.

The electrochemical device may be a lithium ion capacitor.

Advantageous Effects of Invention

As described above, in accordance with the present invention, it is possible to provide an electrochemical device that is excellent in productivity and capable of making the pre-doped state of a negative electrode uniform.

BRIEF DESCRIPTION OF DRAWINGS

FIG. 17 is a table showing SOC after pre-doping of a negative electrode of each electrode unit of an electrochemical device according to Example 2 of the present invention.

FIG. 18 is a table showing the configuration and resistance increase rate of each of electrochemical devices according to Examples and Comparative Example in Example 3 of the present invention.

FIG. 19 is a table showing the number of separators and cycle life of an electrochemical device according to Example 4 of the present invention.

MODE(S) FOR CARRYING OUT THE INVENTION

An electrochemical device according to a first embodiment of the present invention will be described.

Structure of Electrochemical Device

Figure 1:
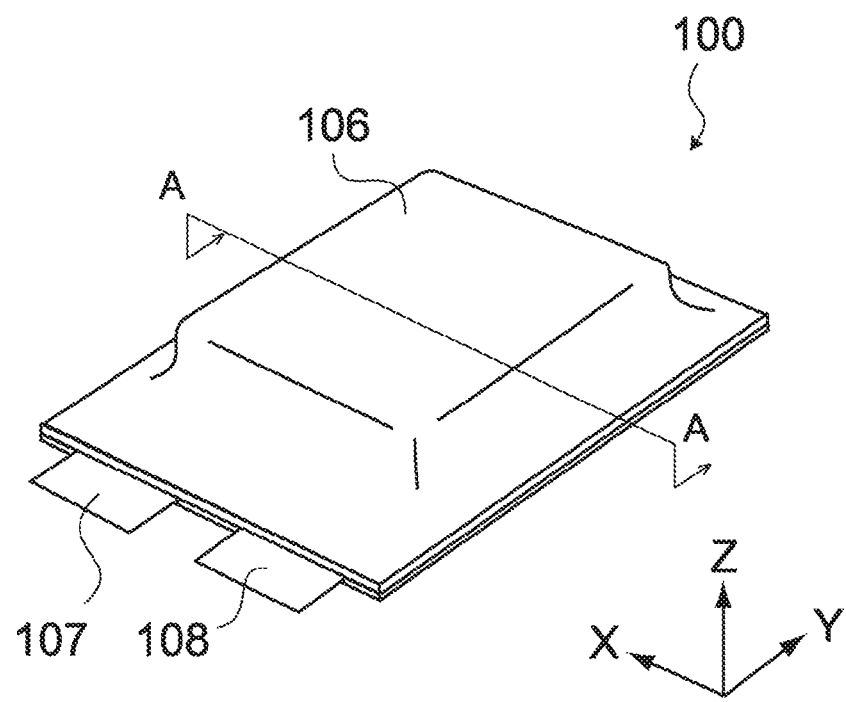
FIG. 1 is a perspective view of an electrochemical device according to an embodiment of the present invention.
Figure 2:
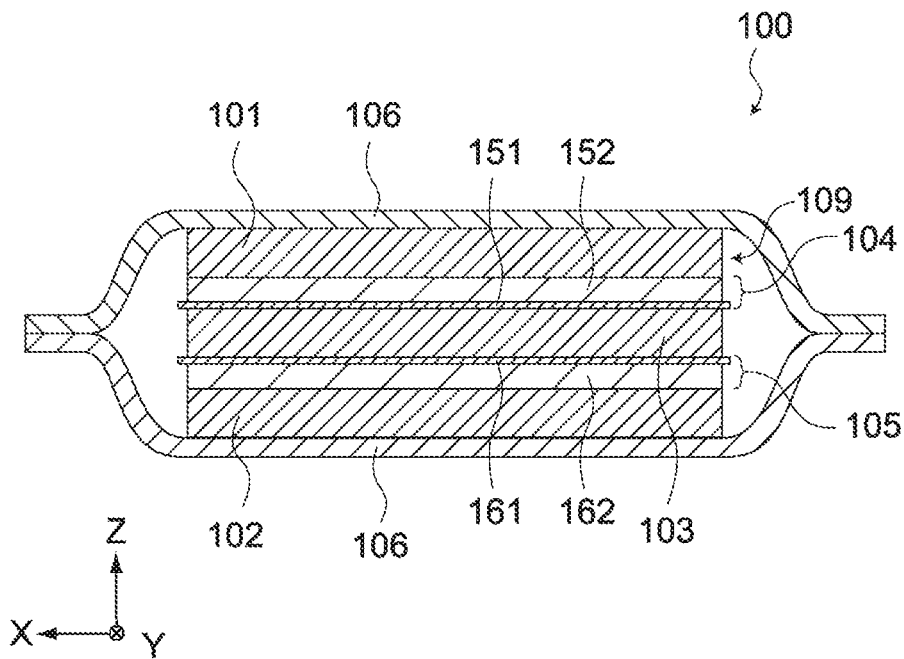
FIG. 2 is a cross-sectional view of an electrochemical device according to a first embodiment of the present invention.

FIG. 1 is a perspective view of an electrochemical device 100 according to this embodiment. FIG. 2 is a cross-sectional view of the electrochemical device 100. FIG. 2 is a cross-sectional view taken along the line A-A in FIG. 1.

The electrochemical device 100 is an electrochemical device that needs pre-doping of lithium ions, and can be a lithium ion capacitor. Further, the electrochemical device 100 may be another electrochemical device that needs pre-doping of lithium ions, such as a lithium ion battery. In the following description, assumption is made that the electrochemical device 100 is a lithium ion capacitor.

As shown in FIG. 1 and FIG. 2, the electrochemical device 100 includes a first electrode unit 101, a second electrode unit 102, a third electrode unit 103, a first lithium ion supply source 104, a second lithium ion supply source 105, an exterior film 106, a positive electrode terminal 107, and a negative electrode terminal 108. Hereinafter, a stacked body of the first electrode unit 101, the second electrode unit 102, the third electrode unit 103, the first lithium ion supply source 104, and the second lithium ion supply source 105 will be referred to as electrode body 109.

The first electrode unit 101, the second electrode unit 102, and the third electrode unit 103 are units each capable of storing electricity. The first electrode unit 101, the second electrode unit 102, and the third electrode unit 103 can have the same structure.

Figure 3:
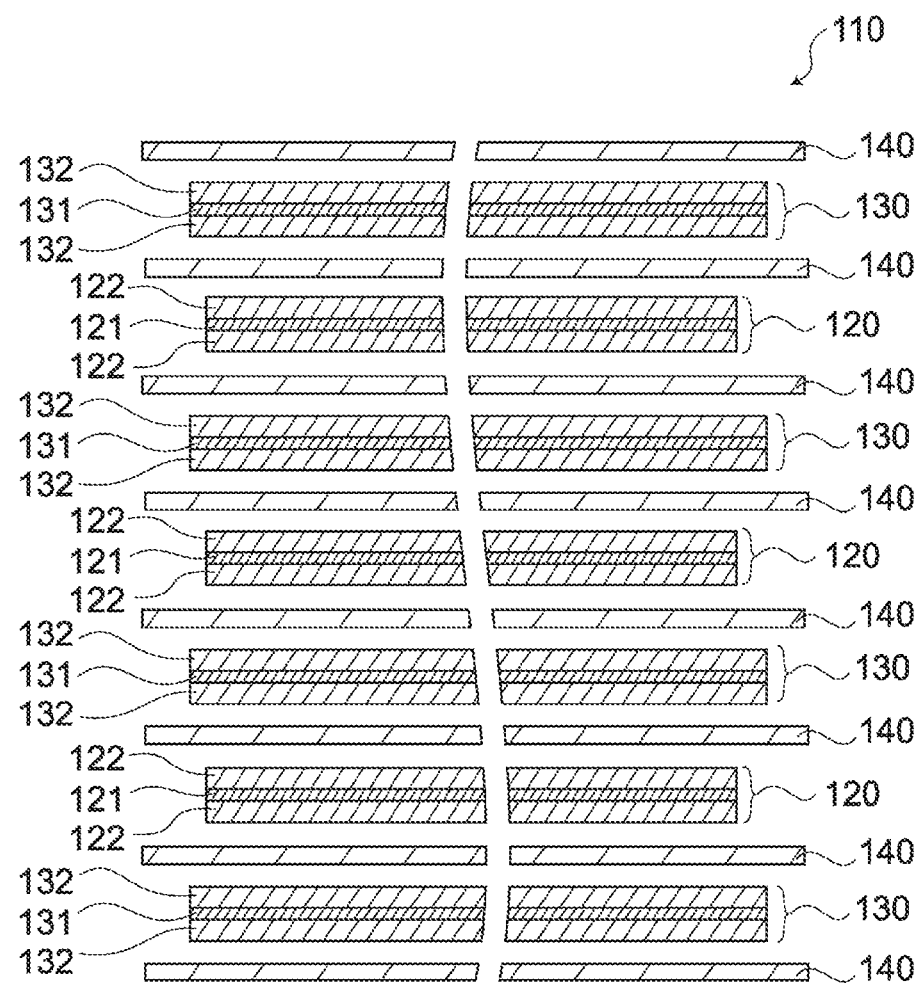
FIG. 3 is a cross-sectional view of an electrode unit of the electrochemical device according to the first embodiment of the present invention.

FIG. 3 is a schematic diagram showing an electrode unit 110 that can be used as the first electrode unit 101, the second electrode unit 102, and the third electrode unit 103. As shown in the figure, the electrode unit 110 includes a positive electrode 120, a negative electrode 130, and a separator 140.

The positive electrode 120 includes a positive electrode current collector 121 and a positive electrode active material layer 122. The positive electrode current collector 121 is a porous metal foil in which a large number of through holes are formed. For example, the positive electrode current collector 121 includes an aluminum foil. The thickness of the positive electrode current collector 121 is, for example, 0.03 mm.

The positive electrode active material layer 122 is formed on the front surface and the back surface of the positive electrode current collector 121. The positive electrode active material layer 122 can be a mixture of a positive electrode active material and a binder resin. The positive electrode active material layer 122 may further contain a conductive aid. Examples of the positive electrode active material include a material that lithium ions and anions in the electrolyte can adsorb, such as activated carbon and polyacene carbide.

The binder resin is a synthetic resin that joins a positive electrode active material. For example, as the binder resin, styrene butadiene rubber, polyethylene, polypropylene, aromatic polyamide, carboxymethylcellulose, fluorinated rubber, polyvinylidene fluoride, isoprene rubber, butadiene rubber, ethylene propylene rubber, or the like may be used.

The conductive aid is particles formed of a conductive material, and improves the conductivity with the positive electrode active material. Examples of the conductive aid include a carbon material such as graphite and carbon black. These materials may be used alone, or two or more of them may be used in combination. Note that the conductive aid may be a metal material, a conductive polymer, or the like as long as the material has conductivity.

The negative electrode 130 includes a negative electrode current collector 131 and a negative electrode active material layer 132. The negative electrode current collector 131 is a porous metal foil in which a large number of through holes are formed. For example, the negative electrode current collector 131 includes a cupper foil. The thickness of the negative electrode current collector 131 is, for example, 0.015 mm.

The negative electrode active material layer 132 is formed on the front surface and the back surface of the negative electrode current collector 131. The negative electrode active material layer 132 can be a mixture of a negative electrode active material and a binder resin. The negative electrode active material layer 132 may further contain a conductive aid. As the negative electrode active material, a material capable of adsorbing lithium ions in the electrolyte, e.g., a carbon material such as non-graphitizable carbon (hard carbon), graphite, and soft carbon, an alloy material such as Si and SiO, and a composite material thereof can be used.

The binder resin is a synthetic resin that joins a negative electrode active material. For example, as the binder resin, styrene butadiene rubber, polyethylene, polypropylene, aromatic polyamide, carboxymethylcellulose, fluorinated rubber, polyvinylidene fluoride, isoprene rubber, butadiene rubber, ethylene propylene rubber, or the like may be used.

The conductive aid is particles formed of a conductive material, and improves the conductivity with the negative electrode active material. Examples of the conductive aid include a carbon material such as graphite and carbon black. These materials may be used alone, or two or more of them may be used in combination. Note that the conductive aid may be a metal material, a conductive polymer, or the like as long as the material has conductivity.

The separator 140 separates the positive electrode 120 and the negative electrode 130, and causes ions contained in the electrolyte to be transmitted therethrough. The separator 140 can be a woven fabric, a non-woven fabric, a synthetic resin microporous film, or the like, and can be formed of, for example, an olefin resin as a main material.

As shown in FIG. 3, the positive electrode 120, the negative electrode 130, and the separator 140 are stacked such that the positive electrode 120 and the negative electrode 130 are alternately disposed via the separator 140, and each of the lowermost layer and the uppermost layer excluding the separator 140 is the negative electrode 130. The number of staked layers of the positive electrode 120 and the negative electrode 130 is not particularly limited. For example, the number of the positive electrodes 120 is nine, and the number of the negative electrodes 130 is 10.

The electrode unit 110 having the above-mentioned structure can be used as the first electrode unit 101, the second electrode unit 102, and the third electrode unit 103. The positive electrode current collector 121 of each electrode unit is electrically connected to the positive electrode terminal 107 directly or via a wiring (not shown). The negative electrode current collector 131 of each electrode unit is electrically connected to the negative electrode terminal 108 directly or via a wiring or the like (not shown).

Figure 4:
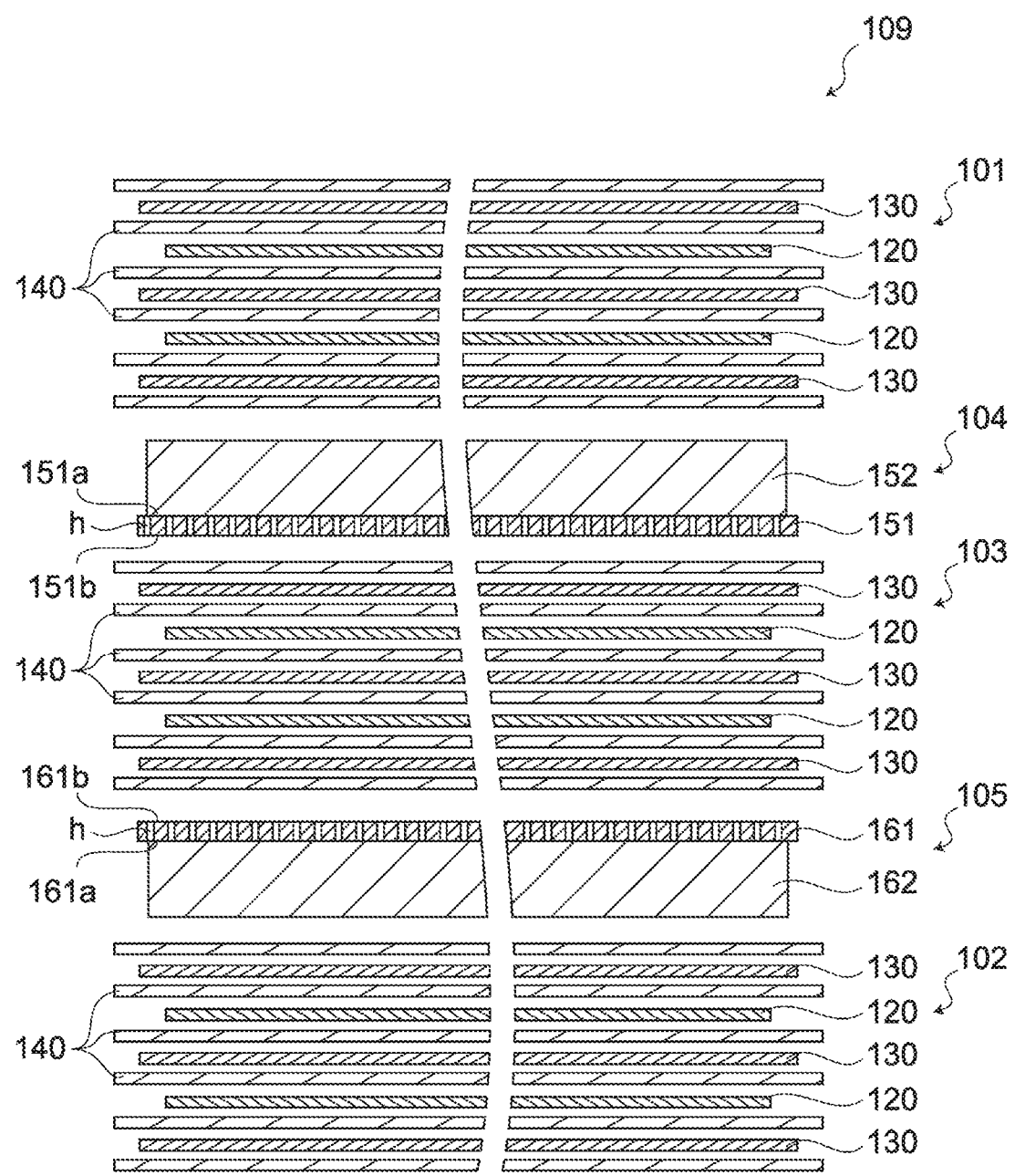
FIG. 4 is an enlarged view of the electrochemical device according to the first embodiment of the present invention.

The first lithium ion supply source 104 is disposed between the first electrode unit 101 and the third electrode unit 103, and supplies lithium ions to the negative electrode 130 of each electrode unit. FIG. 4 is an enlarged view of the electrode body 109. As shown in the figure, the first lithium ion supply source 104 includes a lithium current collector 151 and a metal lithium 152.

The lithium current collector 151 is a porous metal foil in which a large number of through holes (h in FIG. 4) are formed. The lithium current collector 151 includes, for example, a cupper foil. The through holes h are formed to penetrate the lithium current collector 151, and the hole diameter is approximately several ten to several hundred µm, favorably, not more than 500 µm. Further, the opening ratio (ratio of the total area of the through holes to the area of the metal foil) of the through hole is favorably not less than 20% to not more than 35%. The lithium current collector 151 is electrically connected to the negative electrode current collector 131 of each electrode unit directly or via the negative electrode terminal 108.

As shown in FIG. 4, among main surfaces of the lithium current collector 151, a main surface on the side of the first electrode unit 101 will be referred to as first main surface 151a, and a main surface on the side of the third electrode unit 103 will be referred to as second main surface 151b.

The metal lithium 152 is attached to the first main surface 151a by pressure bonding or the like. The metal lithium 152 favorably has an even thickness over the entire surface of the first main surface 151a.

The second lithium ion supply source 105 is disposed between the second electrode unit 102 and the third electrode unit 103, and supplies lithium ions to the negative electrode 130 of each electrode unit. As shown in FIG. 4, the second lithium ion supply source 105 includes a lithium current collector 161 and a metal lithium 162.

The lithium current collector 161 is a porous metal foil in which a large number of through holes (h in FIG. 4) are formed. The lithium current collector 161 includes, for example, a cupper foil. The through holes h are formed to penetrate the lithium current collector 161, and the hole diameter can be approximately several ten to several hundred µm, favorably, not more than 500 µm. Further, the opening ratio of the through hole is favorably not less than 20% and not more than 35%. The lithium current collector 161 is electrically connected to the negative electrode current collector 131 of each electrode unit directly or via the negative electrode terminal 108.

As shown in FIG. 4, among main surfaces of the lithium current collector 161, a main surface on the side of the second electrode unit 102 will be referred to as third main surface 161a, and a main surface on the side of the third electrode unit 103 will be referred to as fourth main surface 161b.

The metal lithium 162 is attached to the third main surface 161a by pressure bonding or the like. The metal lithium 162 favorably has an even thickness over the entire surface of the third main surface 161a.

The exterior film 106 forms a housing space for housing the electrode body 109 and the electrolyte. The exterior film 106 is a laminate film obtained by stacking a metal foil such as an aluminum foil, and a resin. The exterior film 106 is fused and sealed around the electrode body 109. Instead of the exterior film 106, a can-like member capable of sealing the housing space, or the like may be used.

The electrolyte to be housed in the housing space together with the electrode body 109 is not particularly limited. For example, as the electrolyte, a solution that contains $LiPF_6$ or the like as a solute can be used.

The positive electrode terminal 107 is an external terminal of the positive electrode 120, and is electrically connected to the positive electrode 120 of each electrode unit. As shown in FIG. 1, the positive electrode terminal 107 is drawn out from the gap of the exterior film 106 to the outside of the housing space. The positive electrode terminal 107 may be a foil or a wire formed of a conductive material.

The negative electrode terminal 108 is an external terminal of the negative electrode 130, and is electrically connected to the negative electrode 130 of each electrode unit. As shown in FIG. 1, the negative electrode terminal 108 is drawn out from the gap of the exterior film 106 to the outside of the housing space. The negative electrode terminal 108 may be a foil or a wire formed of a conductive material.

Regarding Pre-Doping of Lithium Ions

At the time of production of the electrochemical device 100, by immersing the electrode body 109 in the electrolyte while the lithium current collector 151 and the lithium current collector 161 are electrically connected to the negative electrode current collector 131, the metal lithium 152 and the metal lithium 162 are dissolved and lithium ions are released into the electrolyte. The lithium ions move in the electrolyte, and are doped (pre-doped) in the negative electrode active material layer 132 of the negative electrode 130 of each electrode unit.

Figure 5:
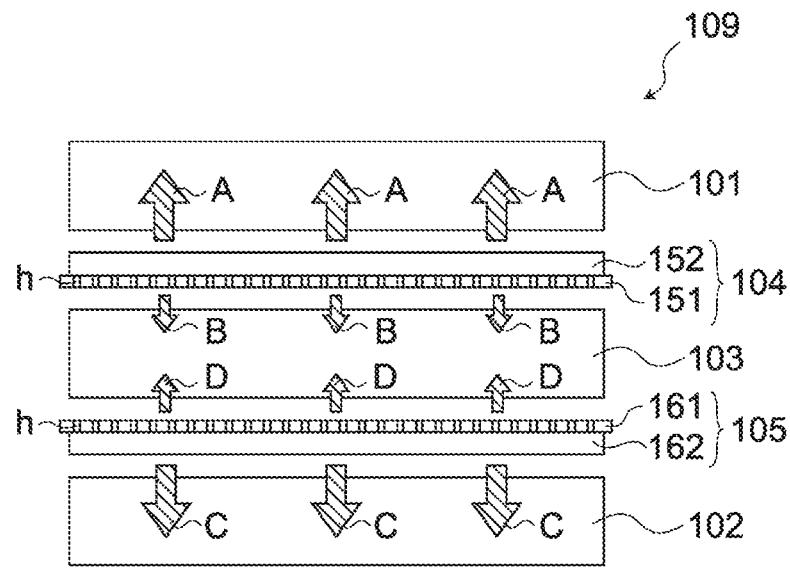
FIG. 5 is a schematic diagram showing a form of pre-doping of lithium ions in the electrochemical device according to the first embodiment of the present invention.

FIG. 5 is a schematic diagram showing pre-doping of lithium ions. As shown in the figure, many of the lithium ions released from the metal lithium 152 are doped in the first electrode unit 101 that the metal lithium 152 faces (arrows A in FIG. 5). Further, some of the lithium ions diffuses through the through holes h of the lithium current collector 151, and a predetermined amount of lithium ions is doped in the third electrode unit 103 (arrows B in FIG. 5).

Since the metal lithium 152 and the third electrode unit 103 are separated by the lithium current collector 151 except for the through holes h, the amount of lithium ions to be doped from the metal lithium 152 into the third electrode unit 103 is less than the amount of lithium ions to be doped from the metal lithium 152 into the first electrode unit 101.

Further, as shown in FIG. 5, many of the lithium ions released from the metal lithium 162 are doped in the second electrode unit 102 that the metal lithium 162 faces (arrows C in FIG. 5). Further, some of the lithium ions diffuse through the through holes h of the lithium current collector 161, and a predetermined amount of lithium ions is doped in the third electrode unit 103 (arrows D in FIG. 5).

Since the metal lithium 162 and the third electrode unit 103 are separated by the lithium current collector 161 except for the through holes h, the amount of lithium ions to be doped from the metal lithium 162 into the third electrode unit 103 is less than the amount of lithium ions to be doped from the metal lithium 162 into the second electrode unit 102.

However, the amount of lithium ions pre-doped in the third electrode unit 103 is equivalent to those in the first electrode unit 101 and the second electrode unit 102 because lithium ions are supplied from both of the metal lithium 152 and the metal lithium 162 to the third electrode unit 103. As a result, the doping amount of lithium ions is uniform between the first electrode unit 101, the second electrode unit 102, and the third electrode unit 103, and it is possible to secure long-term stability of the electrochemical device 100.

Further, by setting the opening ratio of each of the lithium current collector 151 and the lithium current collector 161 to not less than 20% and not more than 35%, it is possible to adjust the doping amount of lithium ions in each electrode unit.

Specifically, in the case where the opening ratio is less than 20%, the amount of lithium ions to pass the through holes of the lithium current collector 151 or the lithium current collector 161 decreases, and the doping amount of the third electrode unit 103 is less than those of the first electrode unit 101 and the second electrode unit 102. Meanwhile, in the case where the opening ratio exceeds 35%, the amount of lithium ions to pass the through holes of the lithium current collector 151 or the lithium current collector 161 increases, and the doping amount of the third electrode unit 103 is more than those of the first electrode unit 101 and the second electrode unit 102 (see Examples).

Therefore, by setting the opening ratio of each of the lithium current collector 151 and the lithium current collector 161 to not less than 20% and not more than 35%, the doping amount of lithium ions can be made uniform between the first electrode unit 101, the second electrode unit 102, and the third electrode unit 103, and it is possible to secure long-term stability of the electrochemical device 100.

Further, since the first lithium ion supply source 104 and the second lithium ion supply source 105 have the same structure, it is unnecessary to form both of them separately, making it possible to reduce the production cost.

Note that the metal lithium 152 and the metal lithium 162 are dissolved in pre-doping as described above, and the metal lithium 152 and the metal lithium 162 do not exist at the time of using the electrochemical device 100. However, it is possible to discriminate the arrangement of metal lithium before pre-doping by the residual metal lithium present in the lithium current collector 151 and the lithium current collector 161, or the like.

Next, an electrochemical device according to a second embodiment of the present invention will be described. The second embodiment is different from the first embodiment in that metal lithium having a different thickness is provided.

Figure 6:
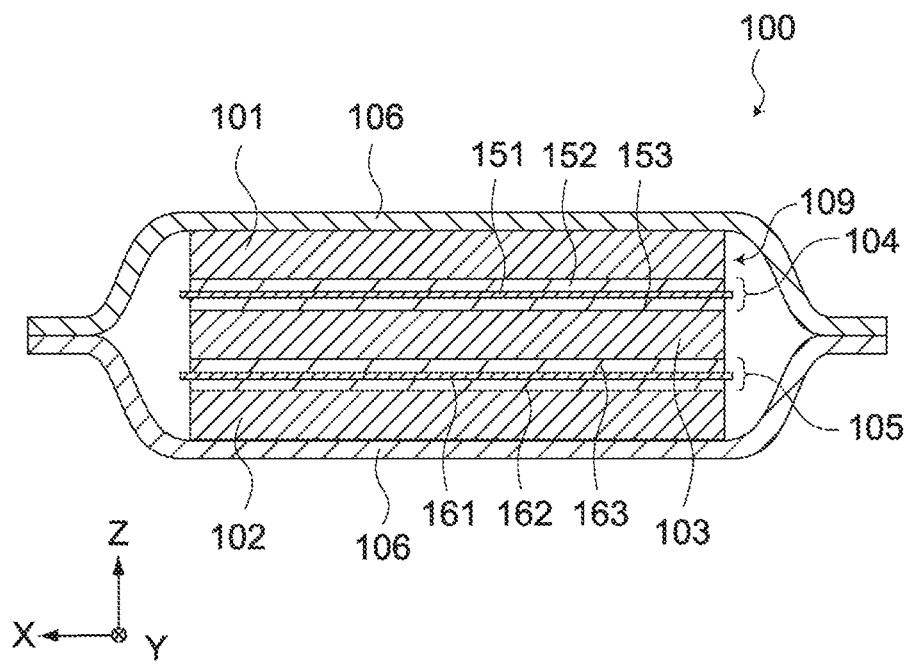
FIG. 6 is a cross-sectional view of an electrochemical device according to a second embodiment of the present invention.
Figure 7:
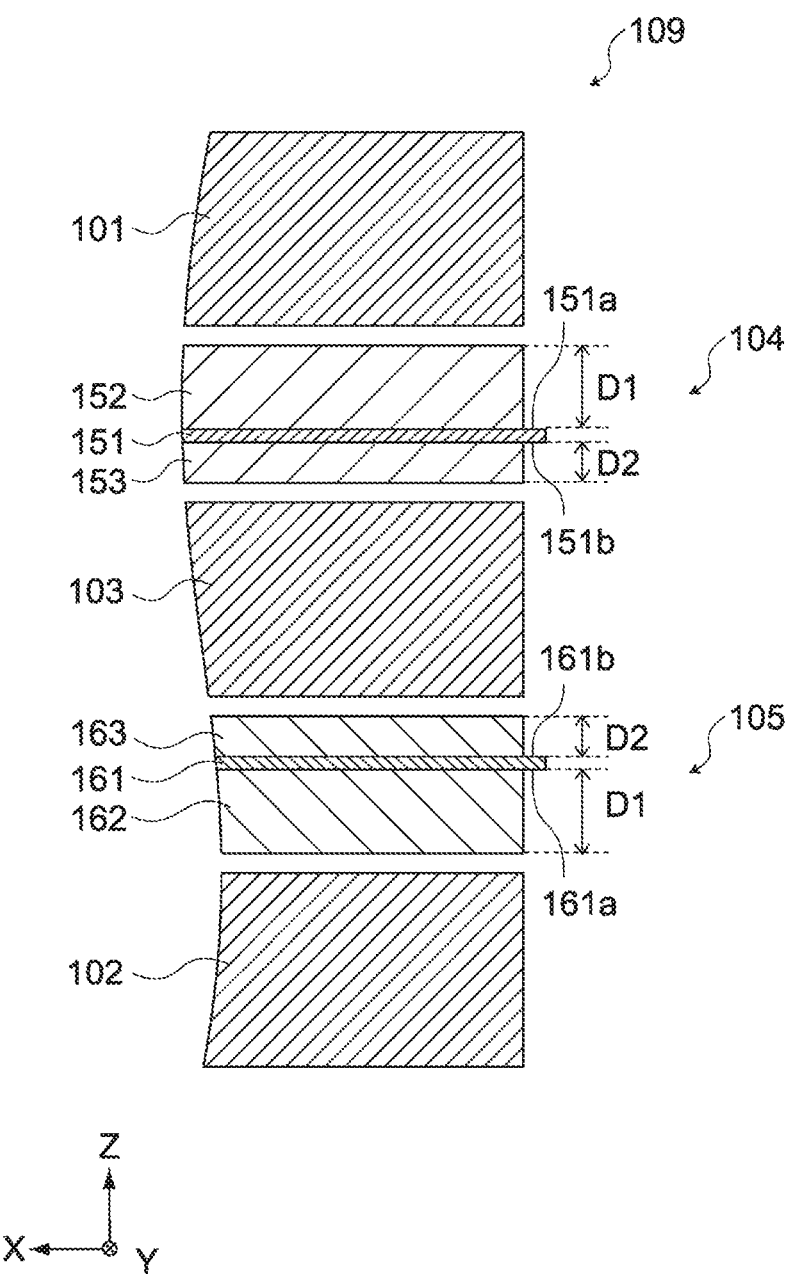
FIG. 7 is an enlarged view of the electrochemical device according to the second embodiment of the present invention.

FIG. 6 is a cross-sectional view of the electrochemical device 100 according to this embodiment. FIG. 7 is an enlarged view of the electrode body 109. As shown in the figures, the first lithium ion supply source 104 includes the lithium current collector 151, a first the metal lithium 152, and a second metal lithium 153.

The first the metal lithium 152 is attached to the first main surface 151a by pressure bonding or the like. The second metal lithium 153 is attached to the second main surface 151b by pressure bonding or the like. As shown in FIG. 7, the thickness of the first the metal lithium 152 will be referred to first thickness D1, and the thickness of the second metal lithium 153 will be referred to as second thickness D2.

Note that the first thickness D1 is larger than the second thickness D2. Specifically, a ratio D1:D2 is favorably in the range of 3:1 to 3:2. In particular, the ratio D1:D2 is more favorably 2:1.

The second lithium ion supply source 105 is disposed between the second electrode unit 102 and the third electrode unit 103, and supplies lithium ions to the negative electrode 130 of each electrode unit. As shown in FIG. 7, the second lithium ion supply source 105 includes the lithium current collector 161, a third metal lithium 162, and a fourth metal lithium 163.

The first metal lithium 162 is attached to the third main surface 161a by pressure bonding or the like. The second metal lithium 163 is attached to the fourth main surface 161b by pressure bonding or the like. As shown in FIG. 7, the third metal lithium 162 has the same thickness D1 as the first the metal lithium 152, and the fourth metal lithium 163 has the same thickness D2 as the second metal lithium 153.

As described above, the first thickness D1 is larger than the second thickness D2. The ratio D1:D2 is favorably in the range of 3:1 to 3:2. In particular, the ratio D1:D2 is more favorably 2:1.

Regarding Pre-Doping of Lithium Ions

At the time of production of the electrochemical device 100, by immersing the electrode body 109 in the electrolyte while the lithium current collector 151 and the lithium current collector 161 are electrically connected to the negative electrode current collector 131, the first the metal lithium 152, the second metal lithium 153, the third metal lithium 162, and the fourth metal lithium 163 are dissolved and lithium ions are released into the electrolyte. The lithium ions move in the electrolyte, and are doped (pre-doped) in the negative electrode active material layer 132 of the negative electrode 130 of each electrode unit.

Figure 8:
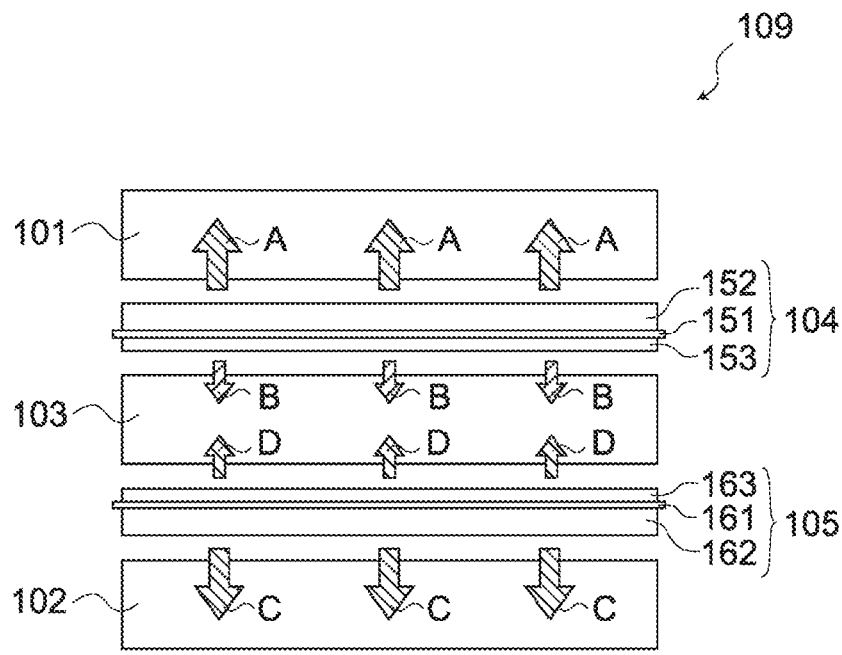
FIG. 8 is a schematic diagram showing a form of pre-doping of lithium ions in the electrochemical device according to the second embodiment of the present invention.

FIG. 8 is a schematic diagram showing pre-doping of lithium ions. As shown in the figure, many of the lithium ions released from the first the metal lithium 152 are supplied to the first electrode unit 101 that the first the metal lithium 152 faces (arrows A in FIG. 8). Further, many of the lithium ions released from the second metal lithium 153 are supplied to the third electrode unit 103 that the second metal lithium 153 faces (arrows B in FIG. 8).

Since the thickness of the first the metal lithium 152, i.e., the first thickness D1 is larger than the thickness of the second metal lithium 153, i.e., the second thickness D2, the amount of lithium ions to be supplied from the second metal lithium 153 to the third electrode unit 103 is less than the amount of lithium ions to be supplied from the first the metal lithium 152 to the first electrode unit 101.

Similarly, many of the lithium ions released from the third metal lithium 162 are supplied to the second electrode unit 102 that the third metal lithium 162 faces (arrows C in FIG. 8). Further, many of the lithium ions released from the fourth metal lithium 163 are supplied to the third electrode unit 103 that the fourth metal lithium 163 faces (arrows D in FIG. 8).

Since the thickness of the third metal lithium 162, i.e., the first thickness D1 is larger than the thickness of the fourth metal lithium 163, i.e., the second thickness D2, the amount of lithium ions to be supplied from the fourth metal lithium 163 to the third electrode unit 103 is less than the amount of lithium ions to be supplied from the third metal lithium 162 to the second electrode unit 102.

However, since lithium ions are supplied from both of the second metal lithium 153 and the fourth metal lithium 163 to the third electrode unit 103, the amount of lithium ions to be supplied to the third electrode unit 103 is equivalent to those in the first electrode unit 101 and the second electrode unit 102. As a result, the doping amount of lithium ions is made uniform between the first electrode unit 101, the second electrode unit 102, and the third electrode unit 103, and it is possible to secure long-term stability of the electrochemical device 100.

If the first thickness D1 and the second thickness D2 are equivalent to each other, the amount of lithium ions to be supplied to the third electrode unit 103 is approximately twice the amount of lithium ions to be supplied to each of the first electrode unit 101 and the second electrode unit 102. Therefore, in order to make the doping amount of each electrode unit approximately the same, it is necessary to further dispose lithium ion supply sources on the upper layer of the first electrode unit 101 and the lower layer of the second electrode unit 102.

Meanwhile, by making the first thickness D1 larger than the second thickness D2, the amount of lithium ions to be doped in each electrode unit by only the first lithium ion supply source 104 and the second lithium ion supply source 105 can be made approximately the same. Further, even in the case where the thickness (the number of stacked layers of the positive electrode 120 and the negative electrode 130) of each electrode unit differs, it is possible to make the doping amount of each electrode unit uniform by adjusting the ratio of the first thickness D1 and the second thickness D2.

Next, an electrochemical device according to a third embodiment of the present invention will be described. The third embodiment is different from the first embodiment in that a first sheet member and a second sheet member are provided.

Figure 9:
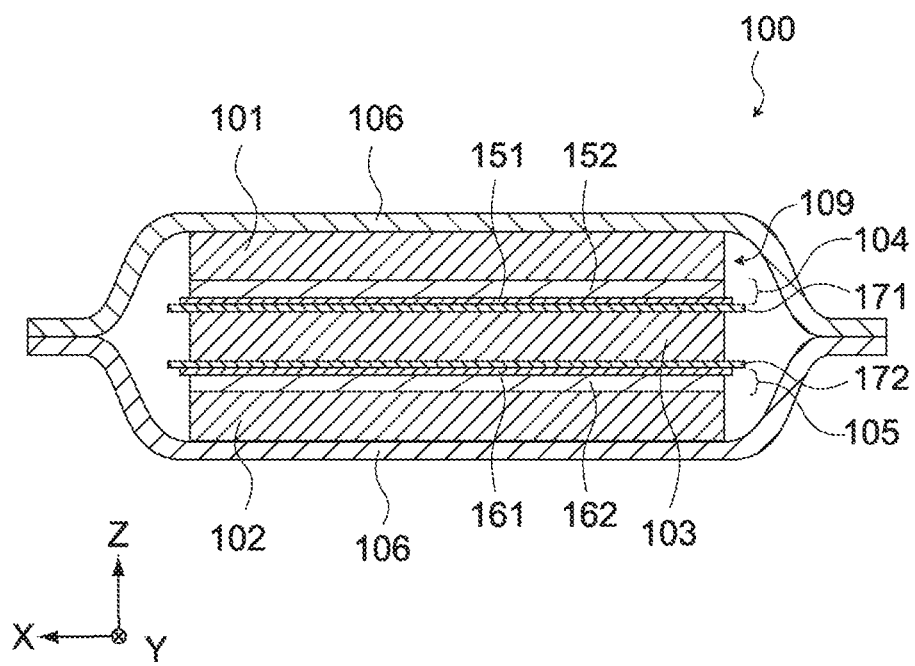
FIG. 9 is a cross-sectional view of an electrochemical device according to a third embodiment of the present invention.
Figure 10:
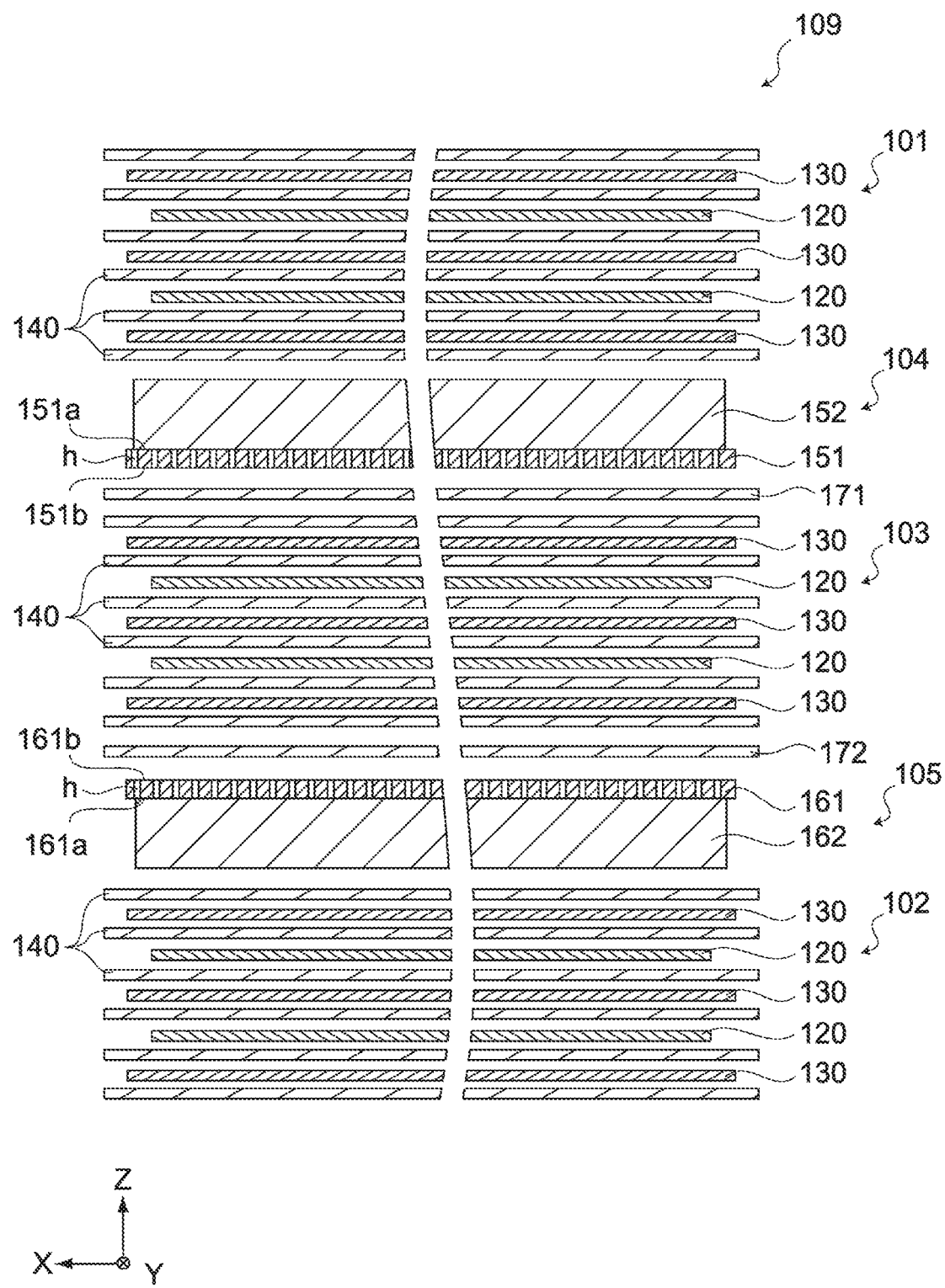
FIG. 10 is an enlarged view of the electrochemical device according to the third embodiment of the present invention.

FIG. 9 is a cross-sectional view of the electrochemical device 100 according to this embodiment. FIG. 10 is an enlarged view of the electrode body 109. As shown in FIG. 9, the electrochemical device 100 includes the first electrode unit 101, the second electrode unit 102, the third electrode unit 103, the first lithium ion supply source 104, the second lithium ion supply source 105, the exterior film 106, the positive electrode terminal 107, the negative electrode terminal 108, a first sheet member 171, and a second sheet member 172.

The first sheet member 171 is disposed between the first lithium ion supply source 104 and the third electrode unit 103, separates the first lithium ion supply source 104 and the third electrode unit 103, and causes lithium ions to be transmitted therethrough. The first sheet member 171 only needs to have ion permeability. The first sheet member 171 can be a woven fabric, a non-woven fabric, a synthetic resin microporous film, or the like, and can be formed of, for example, an olefin resin as a main material. The first sheet member 171 may be a sheet member formed of the same material as the above-mentioned separator 140.

Figure 11:
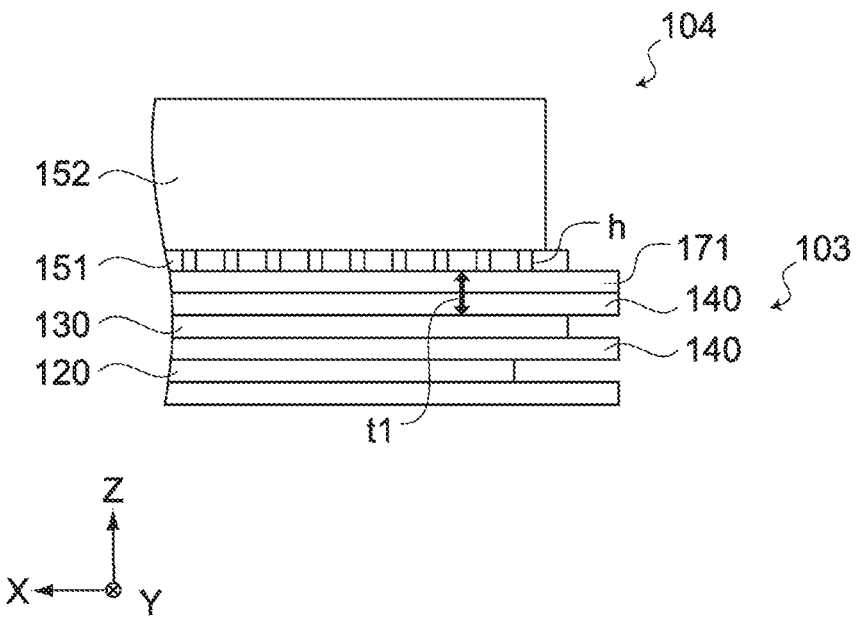
FIG. 11 is a schematic diagram showing a first sheet member of the electrochemical device according to the third embodiment of the present invention.

FIG. 11 is a schematic diagram showing the first sheet member 171. The thickness of the first sheet member 171 is not particularly limited. However, the thickness of the first sheet member 171 is favorably not less than 25 μm. Further, the first sheet member 171 may be obtained by stacking a plurality of sheet members formed of the same material as that of the above-mentioned separator 140.

As shown in FIG. 11, the separator 140 is provided on the outermost layer of the third electrode unit 103. For this reason, by providing the first sheet member 171, the distance (first separation distance t1 in FIG. 11) between the negative electrode 130 and the lithium current collector 151, which is closest to the first lithium supply source 104 in the third electrode unit 103, is the sum of the thickness of the first sheet member 171 and the thickness of the separator 140. This first separation distance t1 is favorable not less than 50 μm.

The second sheet member 172 is disposed between the second lithium ion supply source 105 and the third electrode unit 103, separates the second lithium ion supply source 105 and the third electrode unit 103, and causes lithium ions to be transmitted therethrough. The second sheet member 172 only needs to have ion permeability. The second sheet member 172 can be a woven fabric, a non-woven fabric, a synthetic resin microporous film, or the like, and can be formed of, for example, an olefin resin as a main material. The second sheet member 172 may be a sheet member formed of the same material as the above-mentioned separator 140.

Figure 12:
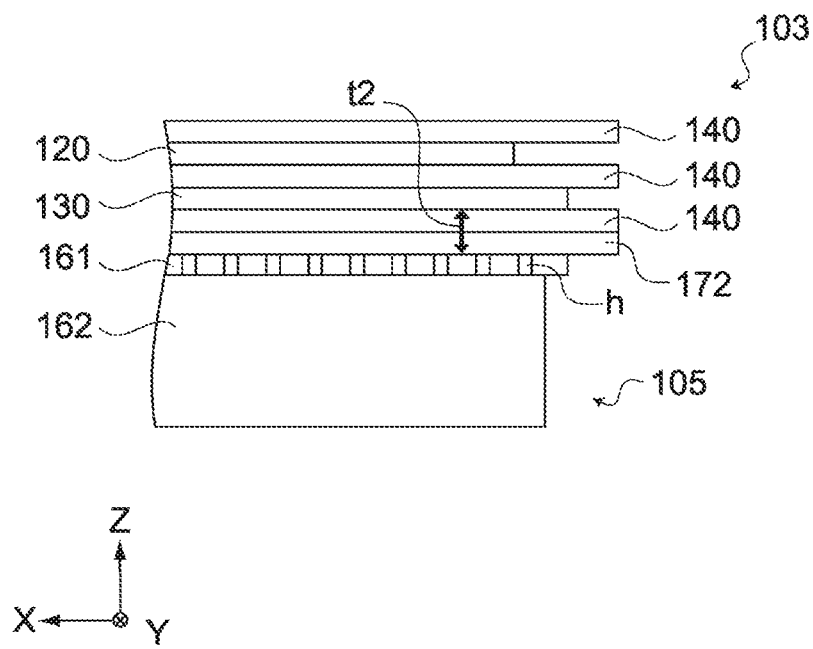
FIG. 12 is a schematic diagram showing a second sheet member of the electrochemical device according to the third embodiment of the present invention.

FIG. 12 is a schematic diagram showing the second sheet member 172. The thickness of the second sheet member 172 is not particularly limited. However, the thickness of the second sheet member 172 is favorably not less than 25 µm. Further, the second sheet member 172 may be obtained by stacking a plurality of sheet members formed of the same material as that of the above-mentioned separator 140.

As shown in FIG. 12, the separator 140 is provided on the outermost layer of the third electrode unit 103. For this reason, by providing the second sheet member 172, the distance (second separation distance t2 in FIG. 12) between the negative electrode 130 and the lithium current collector 161, which is closest to the second lithium supply source 105 of the third electrode unit 103, is the sum of the thickness of the second sheet member 172 and the thickness of the separator 140. This second separation distance t2 is favorably not less than 50 µm.

Pre-Doping of Lithium Ions

At the time of production of the electrochemical device 100, by immersing the electrode body 109 in the electrolyte while the lithium current collector 151 and the lithium current collector 161 are electrically connected to the negative electrode current collector 131, the metal lithium 152 and the metal lithium 162 are dissolved and lithium ions are released into the electrolyte. The lithium ions move in the electrolyte, and are doped (pre-doped) in the negative electrode active material layer 132 of the negative electrode 130 of each electrode unit.

Figure 13:
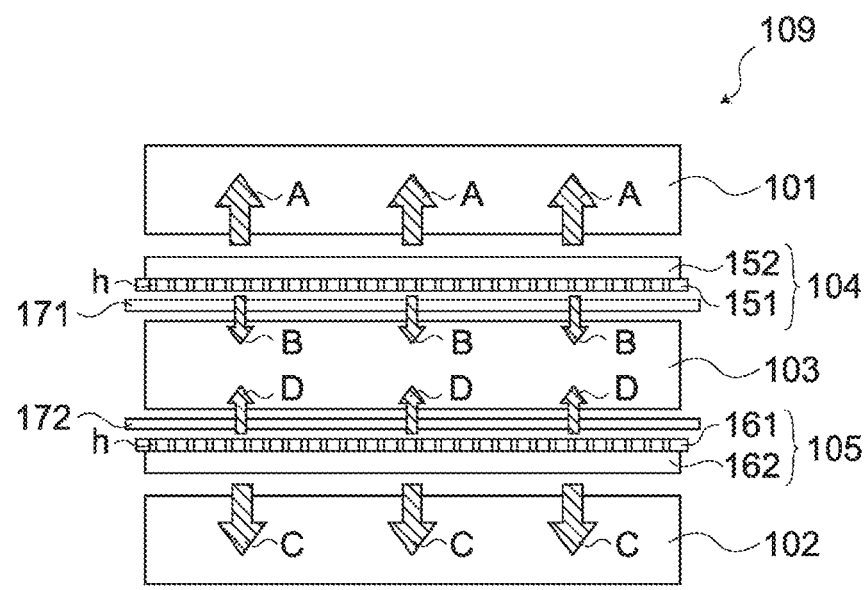
FIG. 13 is a schematic diagram showing a form of pre-doping of lithium ions in the electrochemical device according to the third embodiment of the present invention.

FIG. 13 is a schematic diagram showing pre-doping of lithium ions. As shown in the figure, many of the lithium ions released from the metal lithium 152 are doped in the first electrode unit 101 that the metal lithium 152 faces (arrows A in FIG. 13). Further, some of the lithium ions diffuses through the through holes h of the lithium current collector 151 and the first sheet member 171, and a predetermined amount of lithium ions is doped in the third electrode unit 103 (arrows B in FIG. 13).

Since the metal lithium 152 and the third electrode unit 103 are separated by the lithium current collector 151 except for the through holes h, the amount of lithium ions to be doped from the metal lithium 152 into the third electrode unit 103 is less than the amount of lithium ions to be doped from the metal lithium 152 into the first electrode unit 101.

Further, as shown in FIG. 13, many of the lithium ions released from the metal lithium 162 are doped in the second electrode unit 102 that the metal lithium 162 faces (arrows C in FIG. 13). Further, some of the lithium ions diffuse through the through holes h of the lithium current collector 161 and the second sheet member 172, and a predetermined amount of lithium ions is doped in the third electrode unit 103 (arrows D in FIG. 13).

Since the metal lithium 162 and the third electrode unit 103 are separated by the lithium current collector 161 except for the through holes h, the amount of lithium ions to be doped from the metal lithium 162 into the third electrode unit 103 is less than the amount of lithium ions to be doped from the metal lithium 162 into the second electrode unit 102.

However, since lithium ions are supplied from both of the metal lithium 152 and the metal lithium 162 to the third electrode unit 103, the amount of lithium ions to be pre-doped is equivalent to those of the first electrode unit 101 and the second electrode unit 102. As a result, the doping amount of lithium ions can be constant between the first electrode unit 101, the second electrode unit 102, and the third electrode unit 103, and it is possible to secure long-term stability of the electrochemical device 100.

Further, the first lithium ion supply source 104 and the second lithium ion supply source 105 have the same structure, it is unnecessary to form both of them separately, making it possible to reduce the production cost.

Further, as described above, the first sheet member 171 is provided between the first lithium ion supply source 104 and the third electrode unit 103, and the second sheet member 172 is provided between the second lithium ion supply source 105 and the third electrode unit 103.

Figure 14:
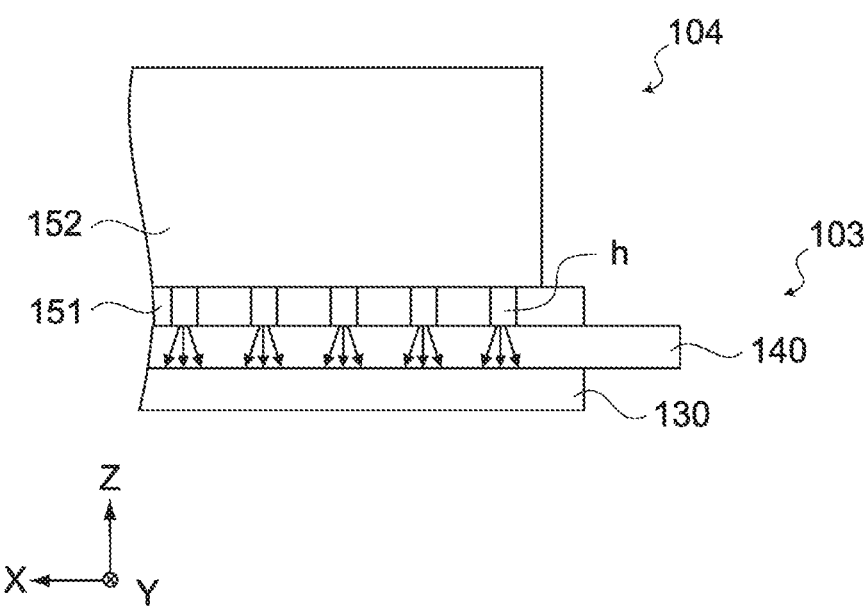
FIG. 14 is a schematic diagram showing a form of diffusion of lithium ions in the case where there is no first sheet member.
Figures 15, 16:
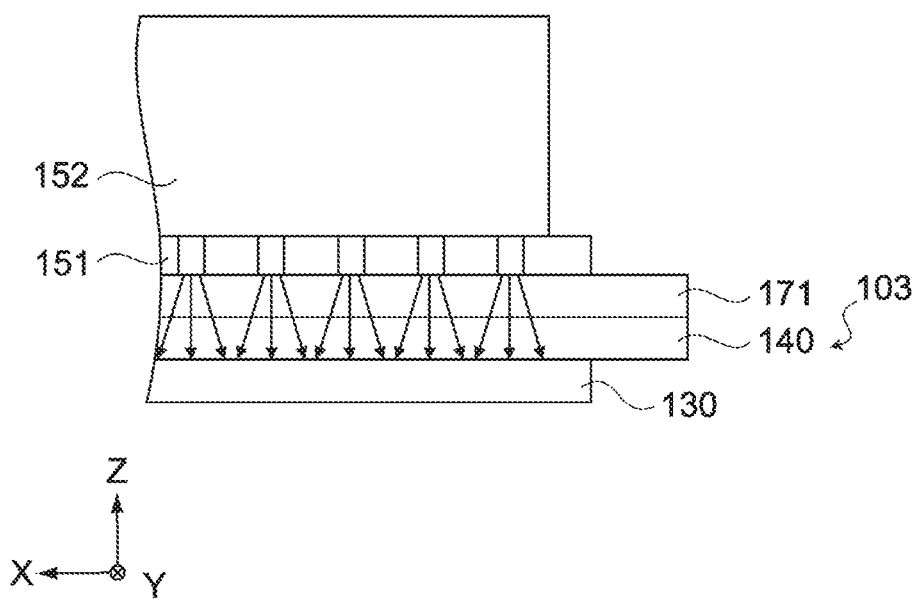
FIG. 15 is a schematic diagram showing a form of diffusion of lithium ions in the case where there is a first sheet member.
FIG. 16 is a table showing SOC after pre-doping of a negative electrode of each electrode unit of an electrochemical device according to Example 1 of the present invention.

FIG. 14 and FIG. 15 are each a schematic diagram showing the effect of the first sheet member 171. If the first sheet member 171 is not provided as shown in FIG. 14, the lithium current collector 151 and the negative electrode 130 approaches each other, and the lithium ions (arrows in FIG. 14) that have reached the third electrode unit 103 through the through holes h are unevenly distributed in the negative electrode 130.

Meanwhile, in the case where the first sheet member 171 is provided as shown in FIG. 15, the lithium current collector 151 and the negative electrode 130 are further away from each other, and the lithium ions (arrows in FIG. 15) that have reached the third electrode unit 103 through the through holes h are evenly distributed in the main surface direction of the negative electrode 130.

Similarly, also regarding the second sheet member 172, the lithium current collector 162 and the negative electrode 130 are further away from each other, and lithium ions are evenly distributed in the main surface direction of the negative electrode 130.

As a result, distribution of lithium ions in the negative electrode 130 of the third electrode unit 130 is made uniform, and it is possible to further secure long-term stability the electrochemical device 100.

MODIFIED EXAMPLE

As described above, the electrochemical device 100 includes the electrode body 109 in which the first electrode unit 101, the second electrode unit 102, the third electrode unit 103, the first lithium ion supply source 104, and the second lithium ion supply source 105 are stacked. Further, in the electrode body 109, the first sheet member 171 and the second sheet member 172 may be further stacked. Note that the electrochemical device 100 may have a structure in which a plurality of the electrode bodies 109 are stacked and housed in the housing space. Also in this case, it is possible to make the doping amount of lithium ions constant between the electrode units of the respective electrode bodies 109.

Further, the thickness of one separator has been 25 µm in the above-mentioned embodiment. However, a plurality of thinner separators may be used to achieve the same thickness.

Example 1

Metal lithium was attached to a cupper foil including through holes (hole diameter of 100 µm, opening ratio of 20%) to prepare a lithium ion supply source. The amount of metal lithium was such that a negative electrode SOC (state of charge) was approximately 60%.

A positive electrode and a negative electrode were stacked via a separator to prepare the above-mentioned electrode unit. The lithium ion supply source was disposed between the electrode units, and three electrode units were stacked to prepare an electrode body. A positive electrode terminal and a negative electrode terminal were connected to the electrode body, and enclosed in a laminate film together with an electrolyte. In this way, a lithium ion capacitor with a capacity of 2000 F was prepared.

Regarding the prepared lithium ion capacitor, the pre-doped states of the negative electrodes between the respective electrode units were compared to each other. FIG. 16 is a table showing the SOC after pre-doping of the negative electrode most distant from the lithium ion supply source in each electrode unit. As shown in the figure, the SOC is approximately the same between the three electrode units, and it has been confirmed that through the through holes of the lithium current collector, lithium ions are doped also on the side (the side of the third electrode unit) of the lithium ion supply source where no metal lithium is provided.

Example 2

Metal lithium was attached to a cupper foil (lithium current collector) including through holes (hole diameter of 100 μm) having various opening ratios to prepare a lithium ion supply source. The amount of metal lithium was such that a negative electrode SOC (state of charge) was approximately 60%.

A positive electrode and a negative electrode were stacked via a separator to prepare the above-mentioned electrode unit. The lithium ion supply source was disposed between the electrode units, and three electrode units were stacked to prepare an electrode body. A positive electrode terminal and a negative electrode terminal were connected to the electrode body, and enclosed in a laminate film together with an electrolyte. In this way, a lithium ion capacitor with a capacity of 2000 F was prepared.

Regarding the prepared lithium ion capacitor, the pre-doped states of the negative electrodes between the respective electrode units were compared to each other. FIG. 17 is a table showing the SOC after pre-doping of the negative electrode most distant from the lithium ion supply source in each electrode unit. In the figure, as shown in Examples a to d, the SOC in each electrode unit has a small difference in the case where the opening ratio is in the range of not less than 20% and not more than 35%, and lithium ions can be doped relatively uniformly.

However, the SOC has a large difference between the electrodes in the case where the opening ratio is 15% (Comparative Example a) and 40% (Comparative Example b), and the doping amount of lithium ions is not uniform. Therefore, it is favorable that the opening ratio of the lithium current collector is not less than 20% and not more than 35%.

Example 3

Metal lithium having a different thickness was attached to both sides of a cupper foil by pressure bonding to prepare the above-mentioned lithium ion supply source. A positive electrode and a negative electrode were stacked via a separator to prepare the above-mentioned electrode unit. The lithium ion supply source was disposed between the electrode units, and three electrode units were stacked to prepare an electrode body. A positive electrode terminal and a negative electrode terminal were connected to the electrode body, and enclosed in a laminate film together with an electrolyte. In this way, a lithium ion capacitor according to Example was prepared.

Further, metal lithium having the same thickness was attached to both surfaces of a cupper foil by pressure bonding to prepare a lithium ion supply source. Except for this, the same configuration as that in Example was used to prepare a lithium ion capacitor according to Comparative Example.

FIG. 18 is a tale showing the ratio of the first thickness D1 and the second thickness D2 in the lithium ion capacitors according to Examples and Comparative Example.

After preserving the lithium ion capacitors according to Examples and Comparative Example for 30 days under the environment of 40° C., the amount of lithium ions doped in each of the outer negative electrode of the electrode unit of the outermost layer and the center negative electrodes of other electrode units was evaluated. Charging and discharging was performed at a current amount 100 C based on the cell capacity. The charging and discharging cycle was performed with CCCV 1 min of charge 100 C, discharge 100 C, and 2.2 V cutoff. Assuming that the initial internal resistance was 100, the change rate of the internal resistance was evaluated. Note that the internal resistance was obtained from the voltage drop obtained from the discharge curve. The change rate of the internal resistance is shown in FIG. 18.

As shown in the figure, it can be seen that in the lithium ion capacitors according to Examples, the increase rate of the internal resistance is smaller than that in the lithium ion capacitor according to Comparative Example and the life time is improved by the doping amount being made uniform.

Example 4

Metal lithium was attached to a cupper foil including through holes (hole diameter of 100 μm, opening ratio of 30%) to prepare a lithium ion supply source. The amount of metal lithium was such that a negative electrode SOC (state of charge) was approximately 60%.

A positive electrode and a negative electrode were stacked via a separator to prepare the above-mentioned electrode unit. The lithium ion supply source and the separators (the first sheet member and the second sheet member) were disposed between the electrode units, and three electrode units were stacked to prepare the above-mentioned electrode body. A positive electrode terminal and a negative electrode terminal were connected to the electrode body, and enclosed in a laminate film together with an electrolyte. In this way, a lithium ion capacitor with a capacity of 2000 F was prepared. A plurality of types of lithium ion capacitors in which the number of separators inserted between the electrode unit and the lithium ion supply source differs was prepared.

Regarding the prepared lithium ion capacitors, a 100 C cycle test was performed under a high temperature environment to measure the cycle life. FIG. 19 is a table showing the cycle life of each of the various lithium ion capacitors. The "cycle life" indicates the number of cycles when DCR (DC resistance) has reached the initial ratio of 200%.

The "number of separators" indicates the number of separators to be used as a first sheet member and a second sheet member, and the thickness of one separator is 25 μm. The "distance between current collector and closest negative electrode" indicates the sum of the thickness of the first sheet member or second sheet member and the thickness of the separator of the electrode unit.

As shown in the figure, in the case where the number of separators was zero, the cycle life was 44,800 cycles. Meanwhile, in the case where the number of separators was one, the cycle life was improved to 53,400 cycles. Hereinafter, similarly, it has been confirmed that the cycle life is improved by increasing the number of separators.

Although embodiments of the present invention have been described above, it goes without saying that the present invention is not limited to only the above-mentioned embodiments and various modifications can be made.

REFERENCE SIGNS LIST 100 electrochemical device
101 first electrode unit
102 second electrode unit
103 third electrode unit
104 first lithium ion supply source
105 second lithium ion supply source
106 exterior film
109 electrode body
110 electrode unit
120 positive electrode
121 positive electrode current collector
122 positive electrode active material layer
130 negative electrode
131 negative electrode current collector
132 negative electrode active material layer
140 separator
151, 161 lithium current collector
152 metal lithium (first metal lithium)
153 second metal lithium
162 metal lithium (third metal lithium)
163 fourth metal lithium
171 first sheet member
172 second sheet member

The invention claimed is:

1. An electrochemical device, comprising:
a first electrode unit in which a positive electrode and a negative electrode are alternately stacked via a separator;
a second electrode unit in which a positive electrode and a negative electrode are alternately stacked via a separator;
a third electrode unit in which a positive electrode and a negative electrode are alternately stacked via a separator, the third electrode unit being disposed between the first electrode unit and the second electrode unit;
a first lithium ion supply source located between the first electrode unit and the third electrode unit, the first lithium ion supply source including a first current collector that is a porous metal foil having a first main surface on a side of the first electrode unit and a second main surface on a side of the third electrode unit;
a second lithium ion supply source disposed between the second electrode unit and the third electrode unit, the second lithium ion supply source including a second current collector that is a porous metal foil having a third main surface on a side of the second electrode unit and a fourth main surface on a side of the third electrode unit;
an electrolyte in which the first electrode unit, the second electrode unit, the third electrode unit, the first lithium ion supply source, and the second lithium ion supply source are immersed,
lithium ions being pre-doped from first metal lithium, second metal lithium, third metal lithium, and fourth metal lithium into the negative electrode of each of the first electrode unit, the second electrode unit, and the third electrode unit,
the first metal lithium having a first thickness and being attached to the first main surface,
the second metal lithium having a second thickness smaller than the first thickness and being attached to the second main surface,
the third metal lithium having the first thickness and being attached to the third main surface, and
the fourth metal lithium having the second thickness and being attached to the fourth main surface.

2. The electrochemical device according to claim 1, wherein
each of the first current collector and the second current collector has an opening ratio of not less than 20% and not more than 35%.

3. The electrochemical device according to claim 1, wherein
a through hole is formed in each of the first current collector and the second current collector, the through hole having a hole diameter of not more than 500 μm.

4. The electrochemical device according to claim 1, wherein
a ratio of the first thickness and the second thickness is within a range of 3:1 to 3:2.

5. The electrochemical device according to claim 1, further comprising:
a first sheet member disposed between the first lithium ion supply source and the third electrode unit, the first sheet member separating the first lithium ion supply source and the third electrode unit and causing lithium ions to be transmitted therethrough; and
a second sheet member disposed between the second lithium ion supply source and the third electrode unit, the second sheet member separating the second lithium ion supply source and the third electrode unit and causing lithium ions to be transmitted therethrough.

6. The electrochemical device according to claim 5, wherein
each of the first sheet member and the second sheet member is a separator.

7. The electrochemical device according to claim 6, wherein
each of the first sheet member and the second sheet member includes a plurality of stacked separators.

8. The electrochemical device according to claim 5, wherein
the first sheet member has a thickness of not less than 25 μm, and
the second sheet member has a thickness of not less than 25 μm.

9. The electrochemical device according to claim 5, wherein
the first sheet member separates the first lithium ion supply source and the negative electrode of the third electrode unit such that a distance between the first current collector and the negative electrode closest to the first lithium ion supply source among the plurality of negative electrodes of the third electrode unit is not less than 50 μm, and the second sheet member separates the second lithium ion supply source and the negative electrode of the third electrode unit such that a distance between the second current collector and the negative electrode closest to the second lithium ion supply source among the plurality of negative electrodes of the third electrode unit is not less than 50 µm.

10. The electrochemical device according to claim 1, wherein the positive electrode of each of the first electrode unit, the second electrode unit, and the third electrode unit includes a positive electrode current collector and a positive electrode active material layer, the positive electrode current collector being a porous metal foil, the positive electrode active material layer including a positive electrode active material and disposed on both of a front surface and a back surface of the positive electrode current collector, and the negative electrode of each of the first electrode unit, the second electrode unit, and the third electrode unit includes a negative electrode current collector and a negative electrode active material layer, the negative electrode current collector being a porous metal foil, the negative electrode active material layer including a negative electrode active material and being disposed on both of a front surface and a back surface of the negative electrode current collector.

11. The electrochemical device according to claim 1, wherein each of the first electrode unit, the second electrode unit, and the third electrode unit has the same thickness.

12. The electrochemical device according to claim 1, wherein the electrochemical device is a lithium ion capacitor.

* * * * *